US010427874B1

United States Patent
Hurd

(10) Patent No.: US 10,427,874 B1
(45) Date of Patent: Oct. 1, 2019

(54) UTILITY BAG FOR HANDLING AND MANEUVERING BULKY EQUIPMENT IN A CONFINED SPACE

(71) Applicant: Daniel Hurd, Cypress, TX (US)

(72) Inventor: Daniel Hurd, Cypress, TX (US)

( * ) Notice: Subject to any disclaimer, the term of this patent is extended or adjusted under 35 U.S.C. 154(b) by 0 days.

(21) Appl. No.: 16/113,402

(22) Filed: Aug. 27, 2018

(51) Int. Cl.
*B65G 7/12* (2006.01)
*B65D 33/06* (2006.01)
*B65D 85/68* (2006.01)
*B65D 33/25* (2006.01)

(52) U.S. Cl.
CPC .............. *B65G 7/12* (2013.01); *B65D 33/06* (2013.01); *B65D 33/2591* (2013.01); *B65D 85/68* (2013.01); *B65D 2585/6812* (2013.01); *B65D 2585/6857* (2013.01)

(58) Field of Classification Search
CPC ...... B65D 33/06; B65D 33/065; B65D 33/10; B65D 33/105; B65D 33/2591; B65D 85/68; B65D 2585/6812; B65D 2585/6857; B65G 7/12
USPC ............ 294/149, 150, 152, 214; 383/16, 22; 5/628, 629; 27/28
See application file for complete search history.

(56) References Cited

U.S. PATENT DOCUMENTS

| 3,128,854 | A | * | 4/1964 | Specht | ..................... | A45C 3/00 190/903 |
| 4,521,045 | A | * | 6/1985 | Hart | ....................... | A47C 27/00 294/149 |
| 5,423,586 | A | * | 6/1995 | Fuller | ..................... | A45C 3/00 294/149 |
| 6,193,293 | B1 | * | 2/2001 | Ybanez | .................... | B65G 7/12 294/152 |
| 7,785,008 | B2 | * | 8/2010 | Schoenig | ............. | B65F 1/0006 294/214 |
| 8,459,710 | B1 | * | 6/2013 | White | ...................... | B65G 7/12 294/152 |
| 2004/0081373 | A1 | * | 4/2004 | Nykoluk | ................. | A45C 3/00 383/2 |
| 2005/0194804 | A1 | * | 9/2005 | Isaacson, Jr. | ............ | B65G 7/12 294/152 |
| 2010/0140970 | A1 | * | 6/2010 | Vrynois | .................. | B65G 7/12 294/152 |

* cited by examiner

*Primary Examiner* — Dean J Kramer
(74) *Attorney, Agent, or Firm* — Lewis & Reese, PLLC

(57) ABSTRACT

A containment system for enclosing and moving heavy equipment, such as air conditioning or water heater components is disclosed. The containment system includes a bag component and a plurality of handles and/or straps. The handles and/or straps are arranged so that workers can easily maneuver heavy equipment into and out of confined spaces, such as an attic. The containment system also prevents damage to structures, such as the interior of a house while moving such heavy equipment.

8 Claims, 6 Drawing Sheets

UTILITY BAG FOR HANDLING AND MANEUVERING BULKY EQUIPMENT IN A CONFINED SPACE

FIELD OF THE INVENTION

The present application relates to a utility bag for handling bulky equipment, such as water heaters and air conditioning equipment within a confined space, such as an attic.

BACKGROUND

Houses in some geographic locations contain utility equipment and/or appliances, such as pieces of the air conditioning system, water heaters, and the like within the attic of the house. Such equipment is typically bulky and heavy, and thus, maneuvering such equipment into and out of the attic is problematic. Particularly, many attics are accessed using hatch with a narrow ladder system and maneuvering such heavy equipment into and out of the attic can be very difficult. Also, structures within the attic, such as duct work, struts, and the like hinder mobility. Moreover, such equipment and/or appliances can become rusty, corroded, and/or dirty during use, and once removed from the attic are difficult to maneuver through the house without soiling the house and/or scuffing the walls, etc. Thus, there is a need for carrying systems to facilitate the carrying of heavy and bulky equipment into and out of confined spaces such as attics and for maneuvering such equipment into and out of houses without damaging structures within the house.

DESCRIPTION

Figure 1A:
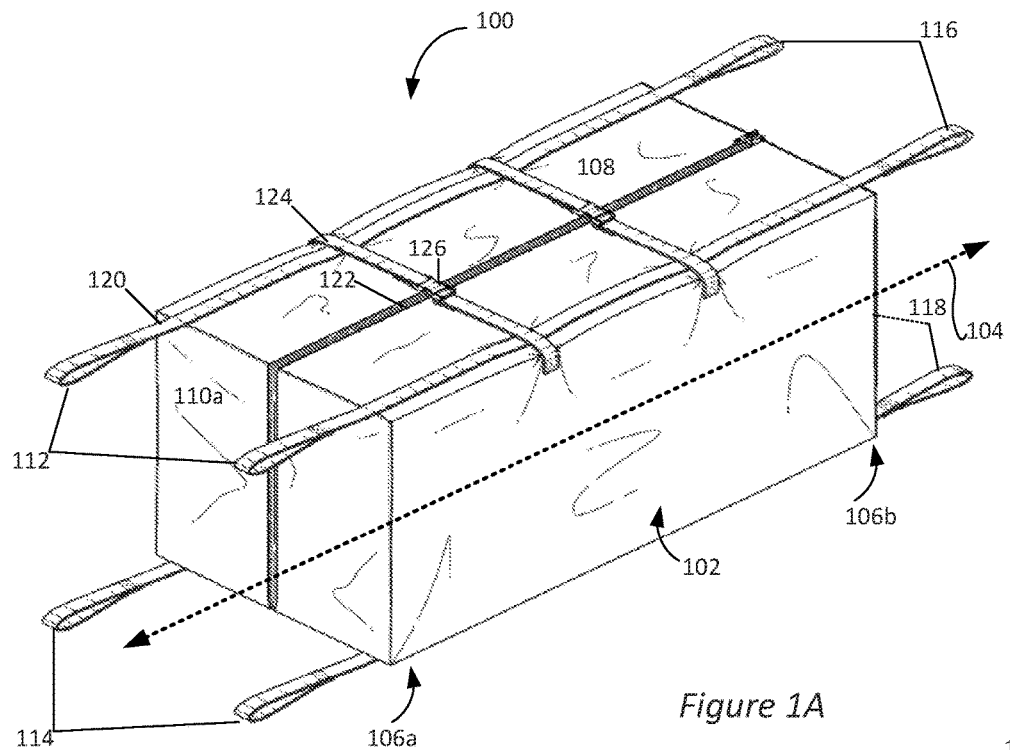
FIGS. 1A-1D illustrate an embodiment of a containment system.
Figure 1B:
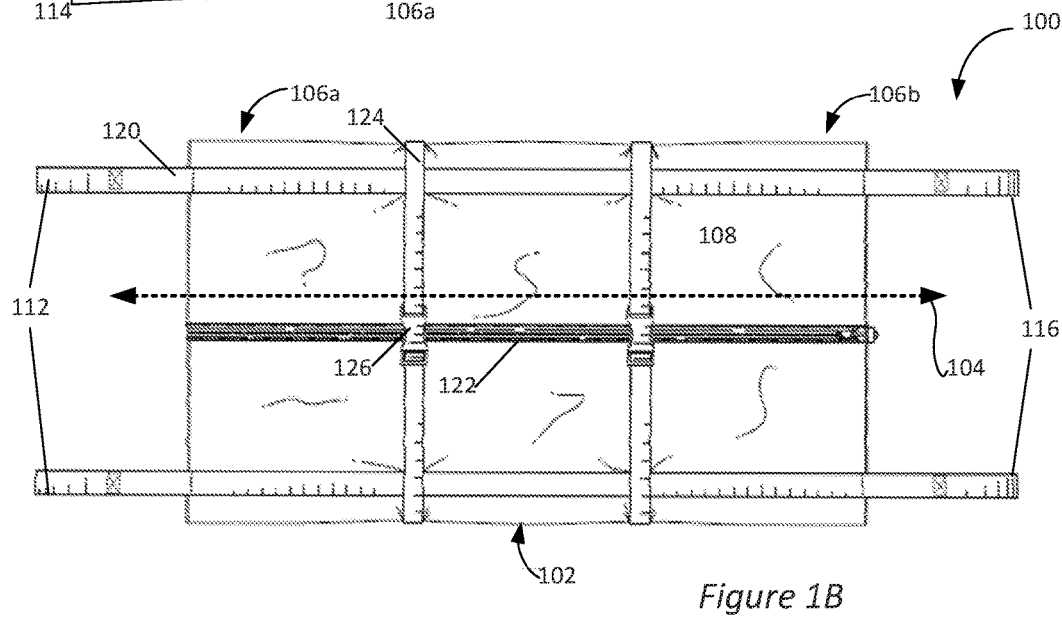
Figure 1C:
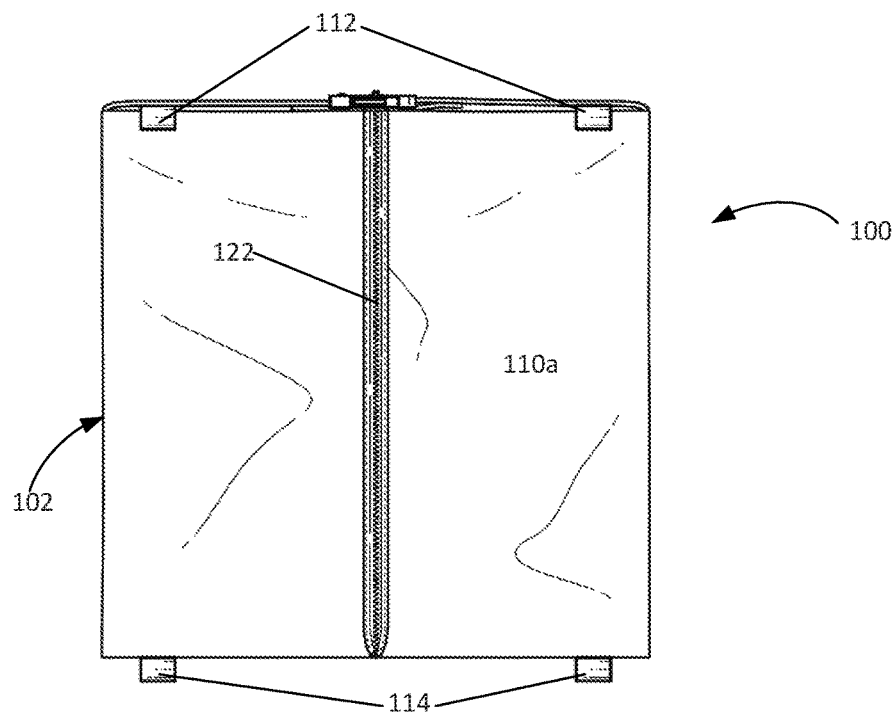
Figure 1D:
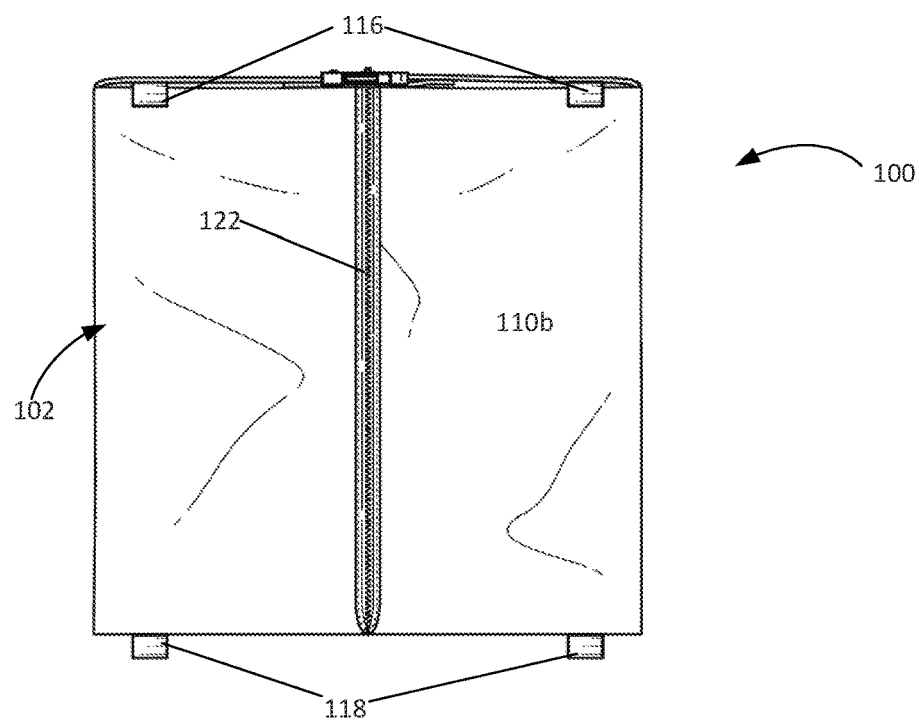
Figure 2A:
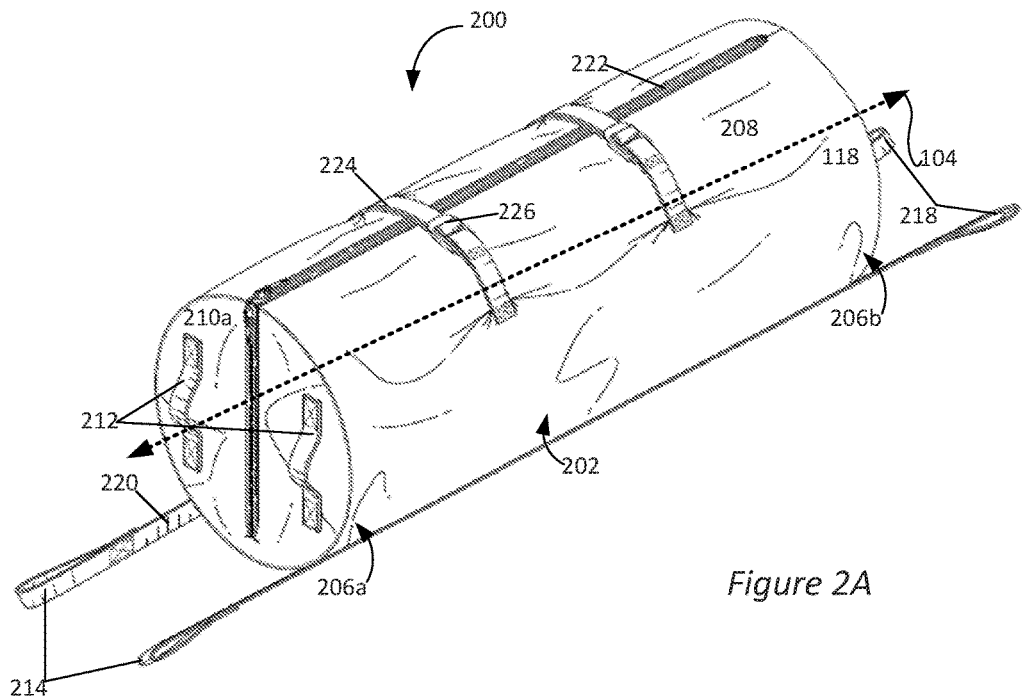
FIGS. 2A-2D illustrate an alternative embodiment of a containment system.
Figure 2B:
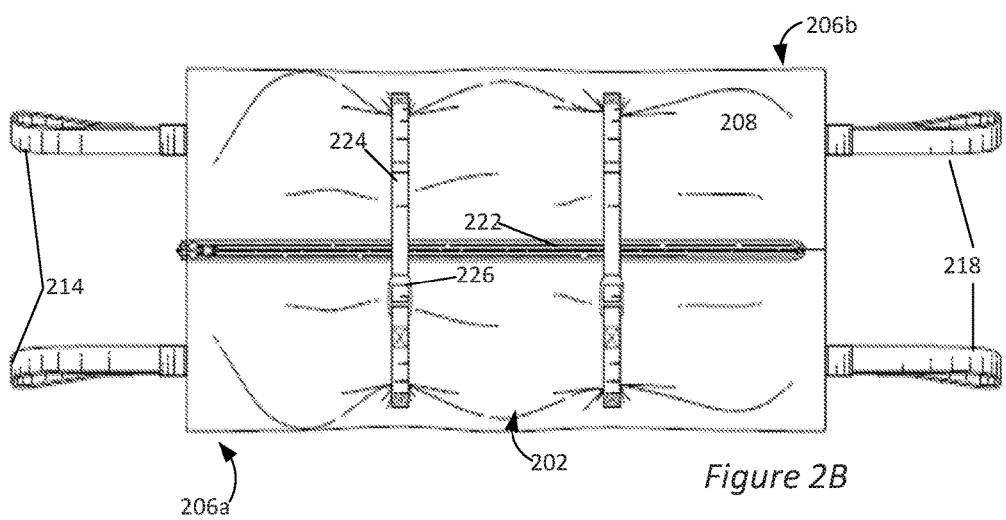
Figure 2C:
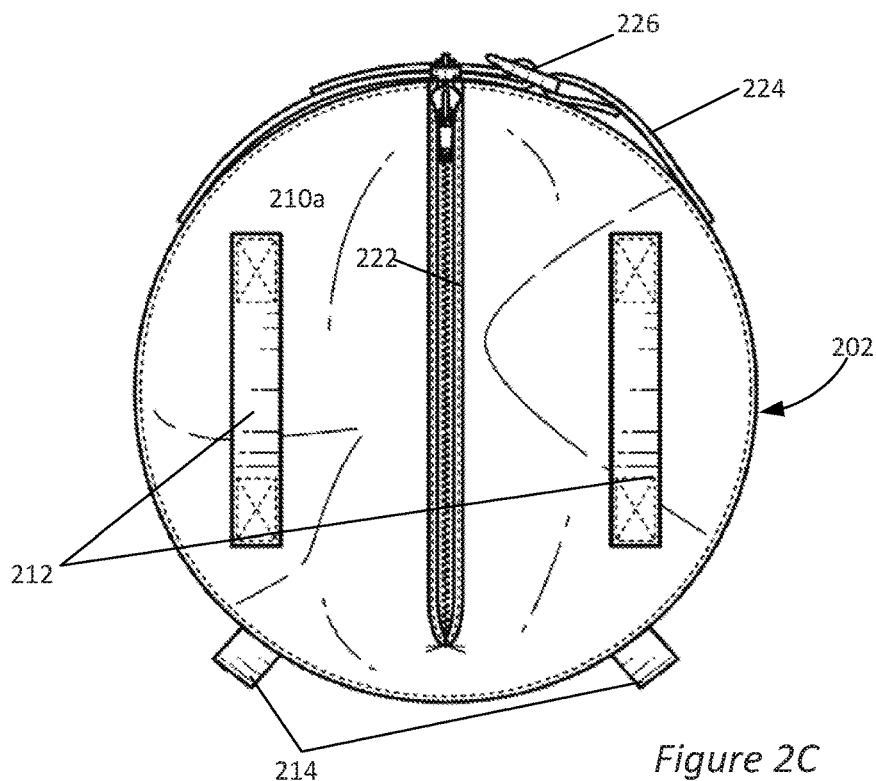
Figure 2D:
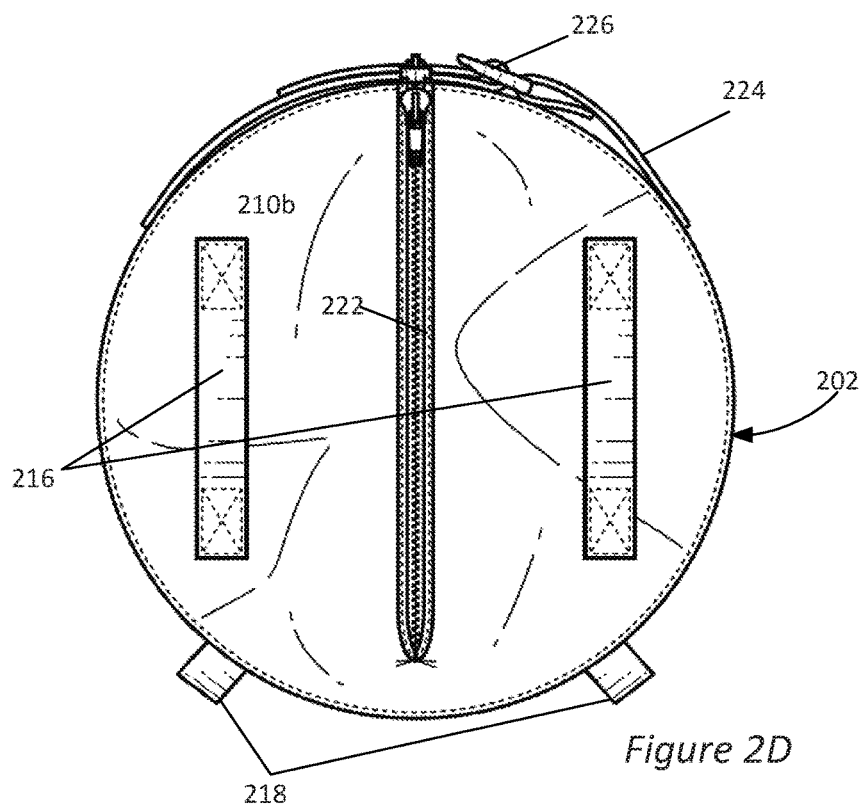

FIGS. 1A-1D show an embodiment of a containment system 100, in perspective view and a top view, and end views, respectively. The containment system can be used to carry and maneuver heavy equipment. For example, the containment system can be used to carry and maneuver equipment that is commonly situated in the attic of a house, such as water heaters and components of an air conditioning system (i.e., high vacuum or HVAC systems) such as air handlers and the like. Such equipment is collectively referred to herein as "attic appliances." It should be noted, though, that the containment system 100 can be used generally to carry any type of load and its utility is not limited to attic appliances.

In the illustrated embodiment, the containment system 100 includes a bag component 102. The bag component 102 has a long axis 104 (i.e., a long dimension, shown in FIGS. 1A and 1B), illustrated as a dashed double arrow, and first and second ends 106a and 106b, respectively. The bag component 100 is sized to accommodate various loads, such as attic appliances. For example, the length along the long dimension may be 40 to 70 inches, though shorter and longer bag components can be used, depending on the application. According to one embodiment, the length of the bag component is 60 inches. The height and width may be 16 to 30 inches, for example, though other heights and widths may be used, depending on the application. According to one embodiment, the height is 30 inches and the width is 24 inches.

In the illustrated embodiment, the bag component 102 includes walls parallel to the long axis 104, such as the top wall 108. The illustrated embodiment also includes bottom, front and back walls, which are not numbered in the illustration. At the first and second ends 106a and 106b, the bag includes a first end panel 110a and a second end panel 110b (see FIGS. 1C and 1D, respectively).

The bag component 102 may be manufactured from generally any material robust enough to contain an attic appliance. According to one embodiment, the bag component may be made of vinyl coated polyester, for example, 18 ounce PVC coated polyester. Other materials, such as heavy-duty nylon, canvas, etc., may be used. Heavy duty thread may be used to sew the bag component 102 and the various straps, handles, and other components (discussed below). According to one embodiment, GORE™ TENARA™ #92 thread (available from Gore Technologies, Newark Del.) is used, though other threads will be apparent to a person of skill in the art. According to some embodiments, the bag component may be reinforced and/or padded.

Referring again to FIGS. 1A-1D, the containment system 100 includes a plurality of handles for lifting and carrying the containment system. In the illustrated embodiment, the containment system 100 includes a first pair of handles 112, a second pair of handles 114, a third pair of handles 116, and a fourth pair of handles 118. In the illustrated embodiment, the first pair of handles 112 is attached to the bag component 102 proximate to the first end panel 110a via straps 120 (note, only one strap 120 is numbered in the drawings, for clarity). The handles may be a loop or other structure in the straps or may be another hand-hold device. As the term "proximate" is used herein, that means that the handles (or intervening straps) may be directly attached to the end panels, they may be attached to the walls near the end panels (i.e., within a few inches of the end panel), or they may be attached to either of those locations via straps or the like.

Notice that in the illustrated embodiment, the first pair of handles 112 is attached to the bag component 102 proximate to the top of the first end panel 110a and the second pair of handles 114 is attached to the bag component 102 proximate to the bottom of the first end panel 110a. The handle configuration is repeated at the other end panel 110b. Such a configuration allows a pair of users to conveniently rotate or re-orientate the load by switching their grips among the available handles. In the embodiment shown in FIGS. 1A-1D, the straps 120 run the length of the bag component 100. However, in other embodiments the straps may not run the entire length. Examples of suitable straps include polypropylene webbing sewn into the bag component 102 with heavy-duty stitching.

The bag component 102 has a closeable opening 122 spanning at least a portion of at least one of the end panels and at least a portion of at least one of the walls. In the embodiment illustrated in FIGS. 1A-1D, the closeable opening spans the top wall 108, the first end panel 110a, and the second end panel 10b. Thus, when the closeable opening 122 is open, the bag component 102 may be laid out almost flat and the attic appliance may be placed in the bag component, and the closeable opening may be closed. According to alternative embodiments, the closeable opening may span an end panel and a portion of the top panel, for example, such that the bag portion may be slipped over the attic appliance (like a foot into a sock).

According to some embodiments, the closeable opening 122 comprises a fastening mechanism, such as a zipper and/or hook and loop fasteners (i.e., VELCRO). In the illustrated embodiment, the fastener is a heavy-duty zipper.

Embodiments of the bag component may include one or more cinch straps for securing the load within in the bag component and for compressing the bag component around the load. In the illustrated embodiment, the bag component 102 has two cinch straps 124. The cinch straps 124 may comprise polypropylene webbing, for example, and may have buckles 126 or clasps for tightening the cinch straps.

As the embodiment of the containment system 100 illustrated in FIGS. 1A-1D features a rectangular bag component 102, that embodiment is suited for rectangular attic appliances, such as air handlers, for example. It is also suited for odd shaped appliances, particularly if the cinch straps are used to secure the load within the bag component 102.

FIGS. 2A-2D illustrate (perspective, top, and two end views, respectively) an alternative embodiment of a containment system 200 having a cylindrical bag component 202. The containment system 200 is particularly suited for basically cylindrical attic appliances, such as water heaters, though other shaped appliances may be handled as well.

In the illustrated embodiment, the containment system 200 includes a cylindrical bag component 202. The bag component 202 has a long axis 204 (i.e., a long dimension, shown in FIG. 2A), illustrated as a dashed double arrow, and first and second ends 206a and 206b, respectively. The bag component 202 is sized to accommodate various loads, such as attic appliances. For example, the length along the long dimension may be 40 to 70 inches, though shorter and longer bag components can be used, depending on the application. According to one embodiment, the length of the bag component is 62 inches. The width may be 16 to 30 inches, for example, though other widths may be used, depending on the application. According to one embodiment, the width is 24 inches.

In the illustrated embodiment, the bag component 202 includes a cylindrical wall 208 parallel to the long axis 204. At the first and second ends 206a and 206b, the bag includes a first end panel 210a and a second end panel 210b (see FIGS. 2C and 2D, respectively). The bag component 202 may be manufactured, as described above.

Referring again to FIGS. 2A-2D, the containment system 200 includes a plurality of handles for lifting and carrying the containment system. In the illustrated embodiment, the containment system 200 includes a first pair of handles 212, a second pair of handles 214, a third pair of handles 216, and a fourth pair of handles 218. In the illustrated embodiment, the first pair of handles 212 is attached to the bag component 202 proximate to the first end panel 210a, and specifically, is sewn directly onto the first end 210a. The second pair of handles 214 is attached to the first end panel 210a via straps 220 (note, only one strap 220 is numbered in the drawings, for clarity).

Note that in the illustrated embodiment, the first pair of handles 212 is attached to the bag component 202 proximate to the middle of the first end panel 210a and the second pair of handles 214 is attached to the bag component 202 proximate to the bottom of the first end panel 210a. The handle configuration is repeated at the other end panel 210b. However, other configurations are possible. For example, the handles may be attached at both the top and the bottom of the bag, or at the top and middle. The important aspect is that, at each end of the bag, two or more pairs of handles are provided which allow for a variety of grip angles to the bag to facilitate maneuvering the loaded bag up and down stairs or a ladder and within confined spaces.

The bag component 202 has a closeable opening 222 spanning at least a portion of at least one of the end panels and at least a portion of at least one of the walls. In the embodiment illustrated in FIGS. 2A-2D, the closeable opening spans the cylindrical wall 208, the first end panel 210a, and the second end panel 210b. Thus, when the closeable opening 222 is open, the bag component 202 may be laid out almost flat and the attic appliance may be placed in the bag component, and the closeable opening may be closed. According to alternative embodiments, the closeable opening may span an end panel and a portion of the top panel, for example, such that the bag portion may be slipped over the attic appliance (like a foot into a sock). The closeable opening 222 may include one or more fastening mechanisms, as described above.

In the illustrated embodiment, the bag component 202 has two cinch straps 224. The cinch straps 24 may comprise polypropylene webbing, for example, and may have buckles 226 or clasps for tightening the cinch straps.

Figure 3A:
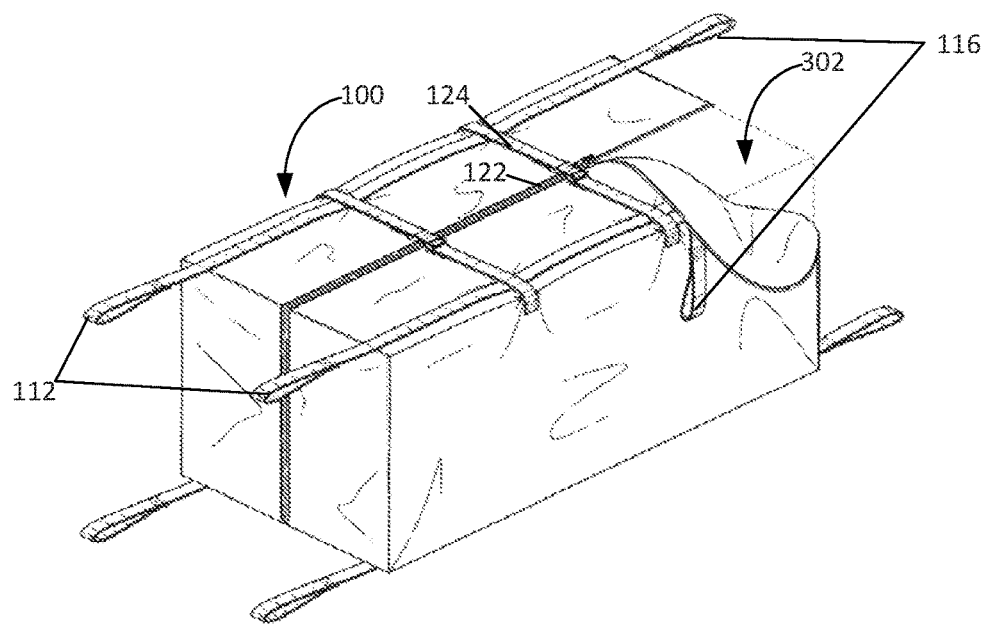
FIGS. 3A and 3B illustrate a method of using a containment system.
Figure 3B:
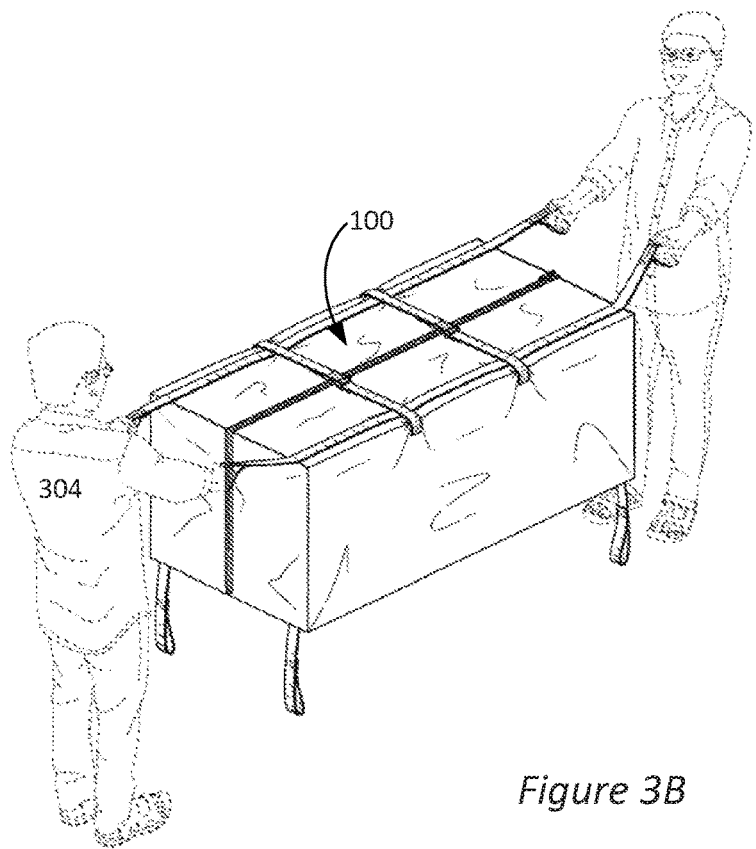

FIGS. 3A and 3B illustrate a method of using a containment system. The method includes providing a containment system 100, as described above. For example, the containment system may be provided in an attic or other confined space. The attic may be accessed via a hatch ladder, for example, and providing the containment system within the attic may comprise opening the hatch ladder, accessing the attic, and carrying the containment system into the attic.

The attic appliance 302 can then be secured within the containment system 100. In the illustrated embodiment, the attic appliance 302 is generally rectangular. The attic appliance may be an air handler, for example. The attic appliance 302 may be secured within the containment system 100 by closing the fastening mechanism of the closeable opening 122, which, in the illustrated example, comprises zipping the zipper. The cinch straps 124 may be used to further secure the attic appliance 302 within the containment system 100.

Once the attic appliance 302 is secured within the containment system 100, two or more users (i.e., workers 304) may lift, maneuver, and move the attic appliance. In the illustrated example, one of the workers uses the first pair of handles 112 and the other worker uses the third pair of handles 116. Thus, both workers can lift the containment system 100 from the tops of their respective ends. It will be appreciated, however, that a major advantage of the containment systems described herein, such as containment system 100, is that the workers can easily switch their grips on the containment system as needed to maneuver the containment system and the load. For example, while maneuvering the containment system 100 out of the attic via a hatch ladder, the worker at the top of the ladder may support most of the weight of the containment system (and load) using the top handles and the worker climbing down the ladder may use primarily the bottom handles to guide the containment system. Or both workers may switch to the bottom handles to maneuver the containment system down the hatch ladder. Once out of the attic, both worker may adjust their grips back to the top handles.

Figure 4A:
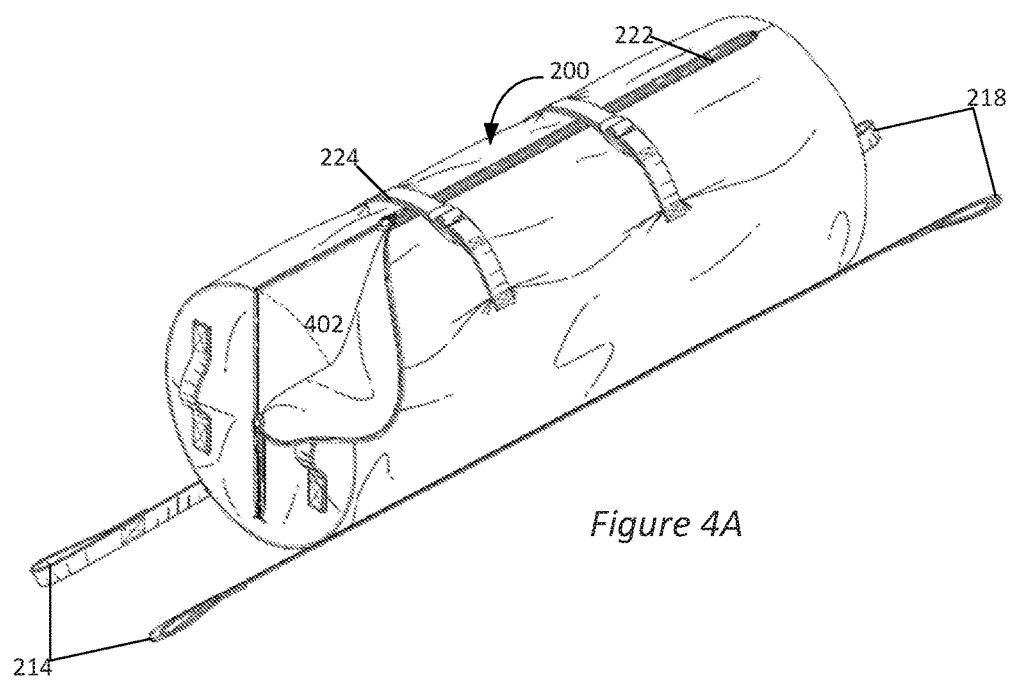
FIGS. 4A and 4B illustrate a method of using a containment system.
Figure 4B:
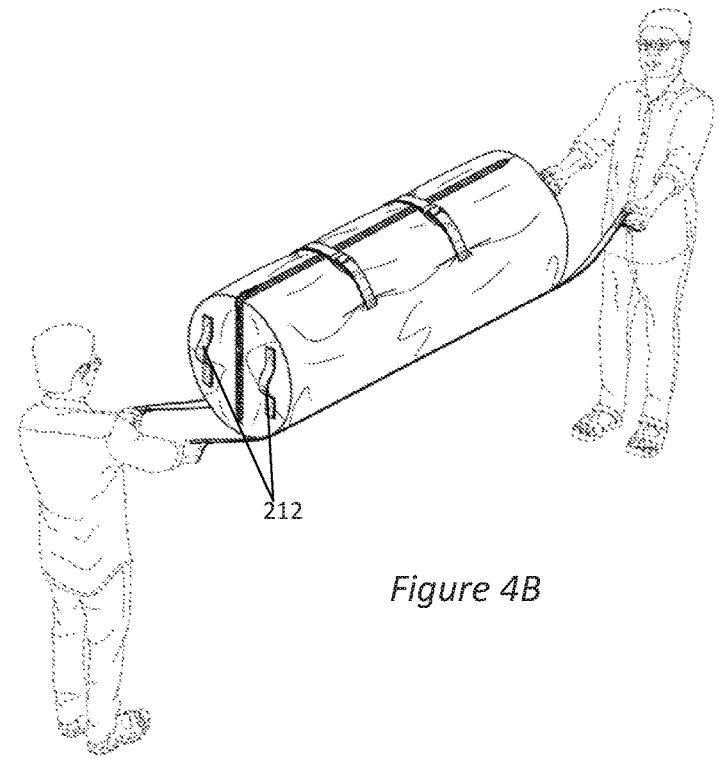

FIGS. 4A and 4B show a method of using the embodiment of a containment system 200. The method includes providing a containment system 200, as described above. For example, the containment system may be provided in an attic or other confined space. The attic may be accessed via a hatch ladder, for example, and providing the containment system within the attic may comprise opening the hatch ladder, accessing the attic, and carrying the containment system into the attic.

The attic appliance 402 can then be secured within the containment system 200. In the illustrated embodiment, the attic appliance 402 is generally cylindrical. The attic appliance may be a water heater, for example. The attic appliance 402 may be secured within the containment system 200 by closing the fastening mechanism of the closeable opening 222, which, in the illustrated example, comprises zipping the zipper. The cinch straps 224 may be used to further secure the attic appliance 402 within the containment system 200.

Once the attic appliance 402 is secured within the containment system 00, two or more users (i.e., workers 304) may lift, maneuver, and move the attic appliance, as described above with respect to FIGS. 3A and 3B. In the illustrated example, one of the workers uses the second pair of handles 214 and the other worker uses the fourth pair of handles 218. However, the workers can easily switch their grips, for example to handles 212, etc.

While the invention herein disclosed has been described in terms of specific embodiments and applications thereof, numerous modifications and variations could be made thereto by those skilled in the art without departing from the scope of the invention set forth in the claims. The written description of specific structures and functions set forth above are not presented to limit the scope of what the Applicant has invented or the scope of the appended claims. Rather, the written description is provided to teach any person skilled in the art to make and use the invention for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity and are not intended to limit the scope of the inventions or the appended claims.

What is claimed is:

1. A containment system for containing and moving an attic appliance, the containment system comprising:
   a cylindrical bag component configured to contain a water heater, the bag component having two ends and a long axis, wherein the bag component comprises:
      a first end panel at the first end, a second end panel at the second end, and at least one wall between the first and second ends, wherein
      the at least one wall is parallel to the long axis, and wherein
      each of the first end panel and the second end panel are perpendicular to the long axis and connected to the at least one wall,
      at the first end, a first pair of handles sewn directly into the first end panel proximate to the middle of the first end panel and a second pair of handles connected to the bag component by straps sewn to the bag component proximate to the first end panel,
      at the second end, a third pair of handles sewn directly into the second end panel proximate to the middle of the second end panel and a fourth pair of handles connected to the bag component by straps sewn to the bag component proximate to the second end panel, and
      a closeable opening spanning a portion of at least one of the first or second end panels and a portion of the at least one wall.

2. The containment system of claim 1, wherein the closeable opening comprises one or more of a zipper and a hook and loop fastener.

3. The containment system of claim 1, wherein the closeable opening spans at least a portion of each of the end panels and spans the at least one wall.

4. The containment system of claim 1, wherein the bag component further comprises one or more cinch straps along the at least one wall and oriented perpendicular to the long axis.

5. A method of removing an attic component from an attic, the method comprising:
   providing a containment system within the attic, wherein the containment system comprises:
      a cylindrical bag component configured to contain a water heater, the bag component having two ends and a long axis, wherein the bag component comprises:
         a first end panel at the first end, a second end panel at the second end, and at least one wall between the first and second ends, wherein
         the at least one wall is parallel to the long axis, and wherein
         each of the first end panel and the second end panel are perpendicular to the long axis and connected to the at least one wall,
         at the first end, a first pair of handles sewn directly into the first end panel proximate to the middle of the first end panel and a second pair of handles connected to the bag component by straps sewn to the bag component proximate to the first end panel,
         at the second end, a third pair of handles sewn directly into the second end panel proximate to the middle of the second end panel and a fourth pair of handles connected to the bag component by straps sewn to the bag component proximate to the second end panel, and
         a closeable opening spanning a portion of at least one of the first or second end panels and a portion of the at least one wall;
   securing the attic component within the containment system,
   using at least one of the first pair of handles and the second pair of handles and at least one of the third pair of handles and the fourth pair of handles to lower the containment system from the attic.

6. The method of claim 5, wherein lowering the containment system from the attic comprises descending a ladder from the attic, wherein a first user at a top of the ladder switches grips between the first pair of handles and the second pair of handles and a second user lower on the ladder than the first user switches grips between the third pair of handles and the fourth pair of handles.

7. The method of claim 5, wherein the closeable opening comprises one or more of a zipper and a hook and loop fastener, and wherein securing the attic component within the containment system comprises closing the one or more of a zipper and a hook and loop fastener.

8. The method of claim 5, wherein the bag component further comprises one or more cinch straps along the at least one wall and oriented perpendicular to the long axis and wherein securing the attic component within the containment system comprises cinching the one cinch straps.

\* \* \* \* \*